Feb. 16, 1954     L. MEDITZ     2,669,169
INVERTOSCOPE FOR PHOTOGRAPHIC CAMERAS
Filed Feb. 19, 1951
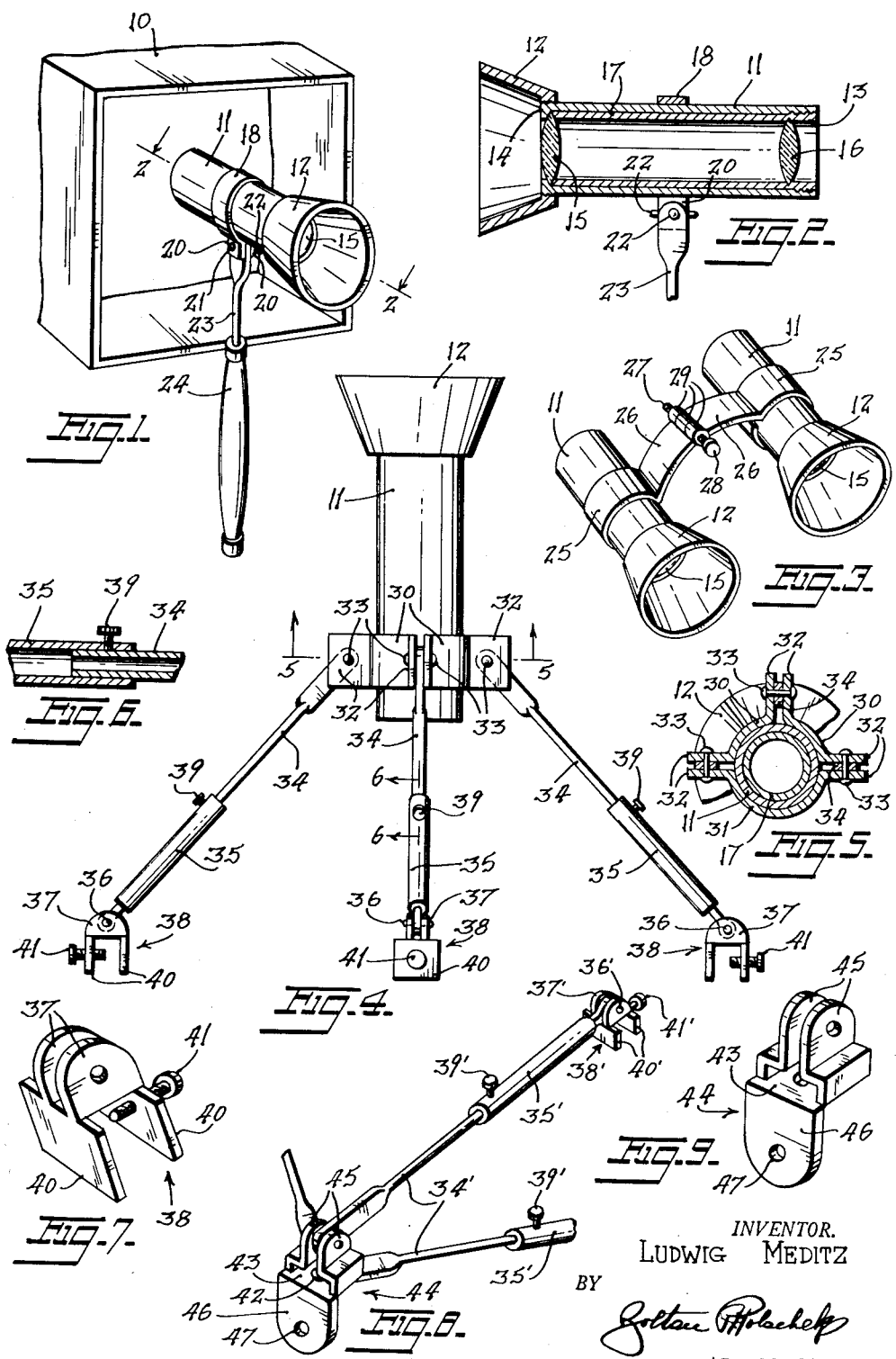
INVENTOR.
LUDWIG MEDITZ
BY
Zoltan Polachek
ATTORNEY Patented Feb. 16, 1954

2,669,169

UNITED STATES PATENT OFFICE 2,669,169

INVERTOSCOPE FOR PHOTOGRAPHIC CAMERAS

Ludwig Meditz, New York, N. Y.

Application February 19, 1951, Serial No. 211,679

2 Claims. (Cl. 95—44)

This invention relates to an invertoscope attachment for photographic cameras of the type which include a viewing hood through which an image focused on a ground glass screen within the camera can be surveyed.

In known manner the said image is projected on said screen in inverted condition so that when viewing the same allowance must be made for the inverted condition thereof.

One object of the invention is the provision of a device removably mountable in the opening of a camera hood to reinvert and magnify the image projected on the said ground glass screen, said means being monocular in form in one instance of the invention and binocular in another instance.

Another object of the invention is to construct said means in such manner that the same is adjustably centerable in camera hoods of various sizes.

Another object of the invention is to provide a modified form of the device which includes a handle for holding the same in position manually, said handle being foldable for economy of packing space.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of one form of the invention in position relative to the hood of a camera.

Fig. 2 is a sectional view on line 2—2 of Fig. 1, with certain parts broken away.

Fig. 3 is a perspective view of a binocular form of the invention.

Fig. 4 is a plan view of another form of the invention.

Fig. 5 is a sectional view on line 5—5 of Fig. 4.

Fig. 6 is a fragmentary enlarged sectional view on line 6—6 of Fig. 4.

Fig. 7 is an enlarged perspective view of a portion of Fig. 4.

Fig. 8 is a fragmentary perspective view illustrating a modification of the means of Fig. 4.

Fig. 9 is an enlarged perspective view of a portion of Fig. 8.

Referring to Figs. 1 and 2 wherein a first form of the invention is illustrated, the reference numeral 10 indicates the hood of a camera, the said hood being utilized to view on a ground glass screen within the camera the inverted image of the scene to be photographed.

A barrel 11 of aluminum or the like is threaded externally at one end to receive a flared eye piece or cup 12 and internally at the other end to receive a retainer ring 13. At its eye piece end the wall of barrel 11 arcs inward slightly as at 14 to retain in the barrel a lens 15. The retainer ring 13 is also utilized to retain a second lens 16 within the barrel, the two lenses being maintained at a set spacing apart by a sleeve 17 loosely mounted in the barrel therebetween.

When the barrel 11 is held in place relative to hood 10, the lens 16 serves to reinvert the inverted image displayed on the ground glass screen of the camera, and the lens 15 serves to enlarge the now upright image. The curvatures of the lenses 15 and 16, of course, depend on the construction of the particular camera with which they are employed and on the results desired.

Secured on the barrel 11 is a collar 18 whose ends are bent off to form tails 20 having therein suitable holes to receive a bolt 21 on which is threaded a wing nut 22. Pivoted on bolt 21 between the tails 20 is the flattened end of a rod 23 which at its lower end is suitably secured in a wooden or plastic handle 24.

The construction is such that by means of handle 24 the barrel 11 can be held in appropriate position relative to hood 10. And, for purposes of storing and packing, rod 23 and handle 24 can be folded against the barrel in obvious manner.

Referring to Fig. 3, a binocular form of the invention comprises a pair of barrels 11 alike in all respects to those described above. Each barrel is encircled by the sleeve-like portion 25 of a strap 26 which extends from the barrel on a somewhat convexly arcuate path. The adjacent ends of the straps 26 are formed with suitable tails 29 which are tightly coiled about a shouldered bolt 27. The threaded end of bolt 27 is provided with a knurled nut 28 which may be removed to project the said bolt end through the flattened end of handle rod 23, or to mount the device on the hood 10 in a manner to be described hereinafter. Thus the handle 24 is utilizable with either the monocular or binocular form of the invention.

Referring now to Figs. 4–7, means for mounting a barrel 11 in appropriate position relative to a hood 10 of any size are illustrated. Secured on the barrel 11 is a sleeve made up of two quarter circular sections 30 and one semicircular section 31. Each section 30 and 31 is provided at either end with a bent off tail 32, the adjacent tails being secured together by rivets or bolts 33. Pivoted on each rivet 33 between the associated tails 32 is the flattened end of a rod or tube 34 which at its other end projects into a tube 35. A set screw 39 threaded in the wall of each tube 35 serves to maintain the desired relation between the same and the associated tube 34. The end of each tube 35 is flattened and is pivoted on a rivet or bolt 36 extending between a pair of ears 37 bent off from a bracket 38, which also includes a pair of walls 40 extending transversely to said ears. Through one of the walls 40 a set screw 41 having a knurled head is threaded.

The construction is such that the effective lengths of the tube arms 34, 35 may be adjusted by manipulation of the set screws 39, and the angular positioning of said arms is adjustable merely by rotating the same about their pivots 33. Further, the brackets 38 are angularly adjustable about their pivots 36. The result is that the walls 40 of the brackets 38 can be secured to the top and side partitions of any size hood 10, and the barrel 11 centered relative to the ground glass screen associated with said hood.

Referring to Figs. 8 and 9, there is illustrated a modification of the mounting means just above described which adapts the same for use with the binocular form of invertoscope described hereinbefore. In Figs. 8 and 9 like parts are given the same reference numerals as hereinbefore with a prime added. In this form of the invention the flattened ends of the two coplanar tubes 35' are pivoted on a single bolt or rivet 42 secured in the central portion 43 of a bracket 44 which also includes a pair of upstanding ears 45 that are offset toward one another a short distance above their bases. The other of the tubes 35' is pivoted between the ears 45. Depending from central portion 43 is a wall 46 extending transversely of the ears 45 and having therein a hole 47 to receive the hinge bolt 27 of the binocular invertoscope described above, see Fig. 3. By means of the nut 28 said binocular device is locked to wall 46 and is secured in place relative to a camera hood the same as described above.

It will be seen therefore that mounting means and manual holding means have been provided for both monocular and binocular invertoscopes.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An invertoscope for cameras having a walled hood through which an image focused on a ground glass screen within the camera can be viewed, which comprises a pair of parallel barrels each having an eye piece and mounted therein inverting and magnifying lenses, a pair of straps each having one end tightly wound about a said barrel and the other projecting away from the barrel at a convexly arched path, curled tails formed on the projected ends of said straps, a shouldered bolt about which said tails are coiled, a finger nut for said bolt, a bracket including a depending tail secured on said bolt by said nut, a central plate, and a pair of ears extending transverse the plate, a trio of adjustable length tubes each having a flattened end, a pair of said ends being co-pivoted to said plate and the other being pivoted between said ears, flattened portions at the other ends of the tubes, and a bracket pivotally secured to the said other end of each tube, each bracket including a pair of ears between which the tube is pivoted, a pair of walls transverse the ears and adapted to embrace the edge of a side or top wall of the hood, and a set screw for securing the bracket to the hood wall.

2. An invertoscope for cameras having a walled hood through which an image focused on a ground glass screen within the camera can be viewed, which comprises a pair of parallel barrels each having an eye piece and mounted therein inverting and magnifying lenses, a pair of straps each having one end tightly wound about a said barrel and the other projecting away from the barrel at a convexly arched path, curled tails formed on the projected ends of said straps, a shouldered bolt about which said tails are coiled, a finger nut for said bolt, a bracket including a depending tail secured on said bolt by said nut, a central plate, and a pair of ears extending transverse the plate, a trio of tubes each having a flattened end, a pair of said ends being co-pivoted to said plate, the other being pivoted between said ears, a second tube into which each first said tube extends, each second tube also having a flattened end, a set screw in the wall of each second tube to fix the first said tube therein, and a bracket to which the flattened end of each second tube is pivoted, each bracket including a pair of ears between which the said flattened end is pivotally mounted, a pair of walls extending transverse said ears and adapted to embrace a top or side wall of said hood, and a set screw to secure the bracket on the wall.

LUDWIG MEDITZ.

References Cited in the file of this patent

UNITED STATES PATENTS

| Number | Name | Date |
| --- | --- | --- |
| 699,767 | Saxby | May 13, 1902 |
| 774,656 | Donnan | Nov. 8, 1904 |
| 2,081,006 | Gallaway | May 18, 1937 |

FOREIGN PATENTS

| Number | Country | Date |
| --- | --- | --- |
| 14,220 | Great Britain | of 1889 |
| 278,797 | Germany | Oct. 5, 1914 |
| 577,611 | France | June 7, 1924 |
| 367,592 | Great Britain | Feb. 25, 1932 |
| 128,639 | Austria | June 10, 1932 |